United States Patent
Takahashi et al.

[11] Patent Number: 6,110,303
[45] Date of Patent: *Aug. 29, 2000

[54] TITANIUM ALLOY MADE BRAKE ROTOR AND ITS MANUFACTURING METHOD

[75] Inventors: Kyo Takahashi; Masahiro Yoshida; Yoshitoshi Hagiwara, all of Saitama, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/816,436

[22] Filed: Mar. 14, 1997

[30] Foreign Application Priority Data

Mar. 15, 1996 [JP] Japan .................................. 8-085961

[51] Int. Cl.$^7$ ........................... F16D 65/14; C22C 14/00; C22F 1/16
[52] U.S. Cl. ..................... 148/421; 148/407; 192/107 M
[58] Field of Search ................. 48/421, 407; 192/107 M

[56] References Cited

U.S. PATENT DOCUMENTS

| | | | |
|---|---|---|---|
| 3,867,208 | 2/1975 | Greko et al. | 75/175.5 |
| 4,482,398 | 11/1984 | Eylon et al. | 148/421 |
| 5,068,003 | 11/1991 | Takahashi et al. | 148/407 |
| 5,526,914 | 6/1996 | Dwivedi et al. | 192/107 M |

FOREIGN PATENT DOCUMENTS

| | | |
|---|---|---|
| 33 26 728 | 2/1984 | Germany . |
| 04337127 | 11/1992 | Japan . |
| 4-337126 | 11/1992 | Japan . |
| 4-337127 | 11/1992 | Japan . |
| 0802465 | 1/1996 | Japan . |
| 1356734 | 6/1974 | United Kingdom ................... 148/407 |

OTHER PUBLICATIONS

Brown, C. W.; Smith, G. C., The effect of rest periods on the fatigue strength of Ti–6A1–4V, Fatigue Eng. Mater. Struct. (1984), 7(2), 155–64 (abstract only).

Patent Abstract of Japan M–1395, "*Disk Rotor*", vol. 17, No. 186, Apr. 12, 1993 (JP4–337127A).

Eylon, D. et al., "High–Temperature Titanium Alloys—A Review", *Journal of Metals*, pp. 55–62, Nov. 1984.

Peters, M., "Neuere Entwicklungen auf dem Gebiet det Titan–Legierungen", *Metall*, vol. 37, No. 6, pp. 584–588, Jun. 1983.

*Primary Examiner*—Sikyin Ip
*Attorney, Agent, or Firm*—Birch, Stewart, Kolasch & Birch, LLP

[57] ABSTRACT

A brake rotor in which deformation against thermal stress is reduced, thereby preventing a surface layer from being cracked or peeled upon operation of the brake rotor at a high temperature. A titanium alloy is heat-treated at a β phase transformation temperature and is quenched, so that grains of the alloy are equiaxed up to sizes ranging from 300 μm to 4 mm, whereby deformation against thermal stress is significantly improved.

15 Claims, 4 Drawing Sheets

CHARACTERISTIC BETWEEN DISK TEMPERATURE AND DISK DISTORSION AMOUNT

CHARACTERISTIC BETWEEN DISK TEMPERATURE AND DISK DISTORSION AMOUNT

TITANIUM ALLOY MADE BRAKE ROTOR AND ITS MANUFACTURING METHOD

BACKGROUND OF THE INVENTION

1. Field of the Invention

The present invention relates to a titanium alloy brake rotor and a manufacturing method therefore. More particularly to a titanium alloy brake rotor in which deformation against thermal stress is reduced and to a manufacturing method for making the brake motor.

2. Description of Background Art

Disk rotors for brakes have been made from iron (cast iron) for providing low cost, reliability in material, and easy manufacturing. The iron brake disk rotor, however, is disadvantageous in that it is heavy in weight and poor in corrosion resistance. As a result, the iron disk rotor largely exerts an adverse effect on fuel consumption, acceleration performance, and inertia force. In addition, corrosion of the disk rotor tends to degrade the braking force and braking mechanism. To solve such a disadvantage, an improved brake disk rotor has been proposed, for example, in Japanese Patent Laid-open Nos. Hei 4-337126 and Hei 4-337127, in which the surface of a rotor main body, which is made from titanium or a titanium alloy, is applied with a double layered coating (underlying layer: hard chromium, surface layer: titanium nitride or titanium carbide).

SUMMARY AND OBJECTIONS OF THE INVENTION

The above-described prior art brake disk rotor in which the surface of the titanium rotor is applied with a double layered coating having a hard chromium layer and a titanium nitride or titanium carbide layer has solved the disadvantage (heavy weight and poor corrosion resistance) of the iron brake disk rotor. However, it presents another disadvantage in that the surface layer is possibly cracked or peeled when the rotor is heated at a high temperature upon braking operation because of a difference in the linear expansion coefficient between the titanium made rotor main body and the surface treatment layer or due to thermal stress of the rotor main body.

An object of the present invention is to provide a brake rotor which is allowed to reduce deformation due to thermal stress, thereby preventing a surface layer from being cracked or peeled when the rotor is heated at a high temperature.

To achieve the above object, according to a first aspect of the present invention, there is provided a titanium alloy brake rotor, which is made from a titanium alloy having a metal structure composed of a $(\alpha+\beta)$ phase and containing equiaxed grains, whereby deformation against thermal stress is reduced. In this brake rotor, the equiaxed grains may have sizes typically ranging from 300 $\mu$m to 4 mm.

According to a second aspect of the present invention, there is provided a method of manufacturing a titanium alloy brake rotor, wherein a $(\alpha+\beta)$ type titanium alloy is heat-treated at a $\beta$ phase-transformation temperature, to form a metal structure composed of a $(\alpha+\beta)$ phase and containing equiaxed grains. In this method, the $(\alpha+\beta)$ type titanium alloy may be quenched after being heat-treated at the $\beta$ phase-transformation temperature.

Concretely, according to the method of manufacturing a titanium alloy brake rotor of the present invention, in the case of using a $(\alpha+\beta)$ type titanium alloy having a composition of Ti-6Al-4V, it may be heat-treated at a $\beta$ phase-transformation temperature typically ranging from 980 to 1200° C.

A titanium alloy made brake rotor according to the present invention is made from a titanium alloy having a metal structure composed of a $(\alpha+\beta)$ phase and containing equiaxed grains. Namely, the titanium alloy is heat-treated at a $\beta$ phase-transformation temperature, to form a metal structure composed of a $(\alpha+\beta)$ phase and containing equiaxed grains (having sizes ranging from several hundred $\mu$m to several mm, for example, from 200 $\mu$m to 4 mm, preferably, from 300 $\mu$m to 3 mm), whereby deformation against thermal stress is reduced without application of any surface treatment.

Specifically, the present invention has a feature of controlling a metal structure of a titanium alloy constituting a disk rotor main body in such a manner that grains of the metal structure are equiaxed, and accordingly, it is advantageous in eliminating the need of the prior art surface coating treatment so as to reduce the manufacturing cost, and also preventing the surface layer from being cracked or peeled when the rotor is heated at a high temperature because it has not been provided with a coating treatment.

Moreover, titanium is easily heated at a high temperature because of a low thermal conductivity compared with a conventional iron material. However, according to the configuration of the present invention, there can be provided a titanium alloy brake disk rotor in which strain caused by thermal stress is reduced, and which has reduced weight, enhanced corrosion resistance, and improved durability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
FIG. 1 is a microscopic photograph showing the metal structure of an inventive titanium alloy.

Hereinafter, a preferred embodiment of the present invention will be described with reference to the drawings.

In the present invention, a $(\alpha+\beta)$ phase means a mixed phase of an $\alpha$ phase (structure: hexagonal closest packing system) and a $\beta$ phase (body-centered cubic structure). Also, a metal structure containing coarsened equiaxed grains means that most of the metal structure contains grains having sizes ranging from several hundred μm to several mm, for example, from 200 μm to 4 mm, preferably, from 300 μm to 3 mm. As compared with a conventional titanium alloy having a metal structure composed of a (α+β) phase containing grains having sizes ranging from several μm to several ten μm, the inventive titanium alloy having the metal structure composed of a (α+β) phase is heat-treated at a β phase-transformation temperature in such a manner that grains are coarsened up to have sizes ranging from several hundred μm to several mm. As a result, the inventive titanium alloy is significantly improved in deformation stiffness against thermal stress at a temperature typically in a range of 500 to 800° C.

As the titanium alloy of the present invention, there is suitably used a (α+β) type titanium alloy having a composition of Ti-6Al-4V, Ti-6Al-6V-2Sn, Ti-6Al-2Sn-4Zr-6Mo, Ti-6Al-2Sn-4Zr-2Mo, or Ti-6Al-2Sn-4Zr-2Mo-0.1Si.

The β phase-transformation temperature of the (α+β) type titanium alloy means that the (α+β) phase is transformed into the β phase over the β phase-transformation temperature. The β phase-transformation temperature, through which the β phase is transformed into the (α+β) phase, is gradually changed as the added amount of a β phase stabilizing element is increased; and it is determined on the basis of the composition of the alloy. Concretely, a Ti-6Al-4V alloy has a β phase-transformation temperature typically in a range of 1000° C.±14° C.

According to the present invention, a (α+β) type titanium alloy is heat-treated at the β phase-transformation temperature. For example, the Ti-6Al-4V alloy has a heat-treatment range of from 986 to 1200° C., and it has a β phase-transformation temperature typically in a range of 1000° C.±14° C. Accordingly, the lower limit of the heat-treatment range may be set at 986° C., and the upper limit is preferably set at 1200° C. in terms of practical factors such as heat-treatment efficiency and the ability of the heat-treatment furnace. The heat-treatment time is suitably set depending on the size of a brake rotor to be heat-treated. Preferably, the heat-treatment condition of the Ti-6Al-4V alloy is set at 1050° C. for 2 hours.

Next, one example of the titanium alloy brake rotor of the present invention is shown in FIGS. 5(a) to 5(c) and FIG. 6. FIGS. A brake is generally classified into a disk type or a drum type, and in this embodiment, the description will be made by example of the disk type. In FIGS. 5(a) to 5(c) and FIG. 6, a disk rotor 5 is provided wherein rotation is stopped when the disk rotor is held between brake pads (not shown). A portion 6 of the disk rotor 5 is slightly thinned or reduced in thickness. Cutouts 7 and semi-circular recesses 8 are formed in the thinned portion 6 of the disk rotor. The cutout 7 is provided for reducing the weight, and the semicircular recess 8 is provided for fixing the disk rotor 5 with a wheel hub 9 by means of a pin 11.

Figure 5A:
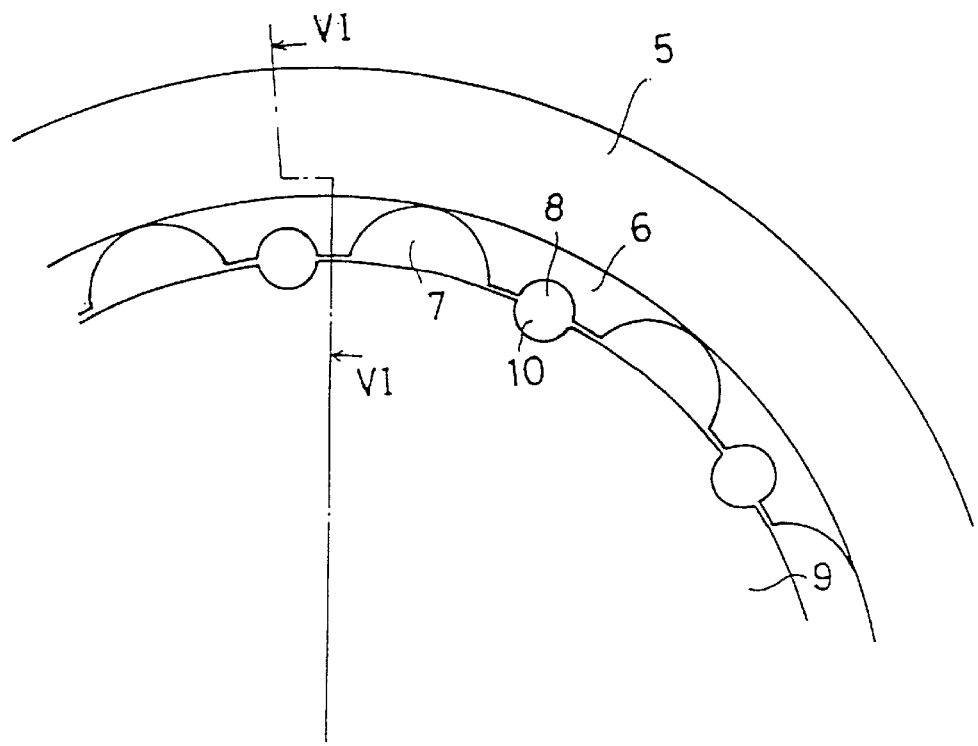
FIGS. 5(a), 5(b) and 5(c) are plan views of a brake rotor as an embodiment of the present invention.
Figure 5B:
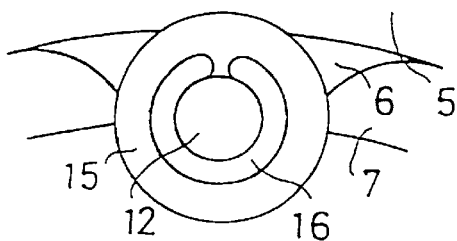
Figure 5C:
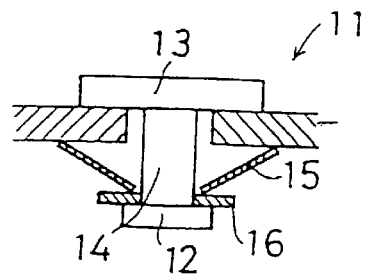
Figure 6:
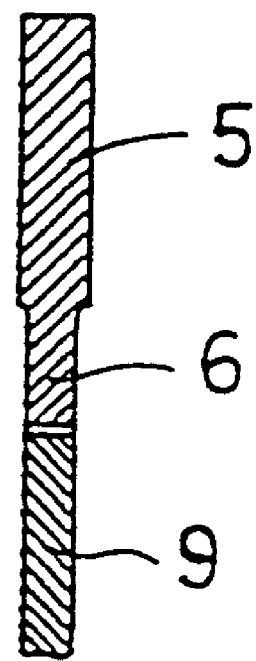
FIG. 6 is a sectional view taken on line VI—VI of FIG. 5(a).

The fixing of the disk rotor 5 with the wheel hub 9 is, as shown largely in FIGS. 5(b) and 5(c), performed by matching each of semi-circular recesses 10 formed in the wheel hub 9 with each of the recesses 9 formed in the disk rotor 6, followed by fixing them by means of the pin 11. The pin 11 has a small head portion 12 having a diameter being substantially the same as that of each of the recesses 8 and 10, a large head portion 13 having a diameter larger than that of each of the recesses 8 and 10, and a shaft portion 14 connecting the small head portion 12 to the large head portion 13. After the small head portion 12 of the pin 11 is inserted in the recesses 8 and 10, a countersunk spring 15 is fitted to the small head portion 12 and the shaft portion 14 and a snap ring 16 is interposed between the small head portion 12 and the countersunk spring 15, to fix the disk rotor 5 to the wheel hub 9. The disk rotor 5, which is directly connected to the wheel hub 9 and is rotated together with the wheel, is held by friction plates called brake pads, to stop the rotation of the wheel.

The present invention will be more fully described with reference to the following example.

A (α+β) type titanium alloy having a composition of Ti-6Al-4V was heat-treated at a β phase-transformation temperature of 1050° C. for two hours and then quenched, to form a structure in which a resistance against high temperature strain was improved by the effect of a residual β phase having equiaxed grains created by quenching. The grains of the titanium alloy thus obtained were observed to be coarsened up to sizes ranging from 300 μm to 4 mm, with a result that the deformation stiffness against thermal stress at a temperature typically in a range of from 500 to 800° C. was significantly improved.

The grains of the titanium alloy will be described with reference to FIGS. 1 and 2.

Figure 2:
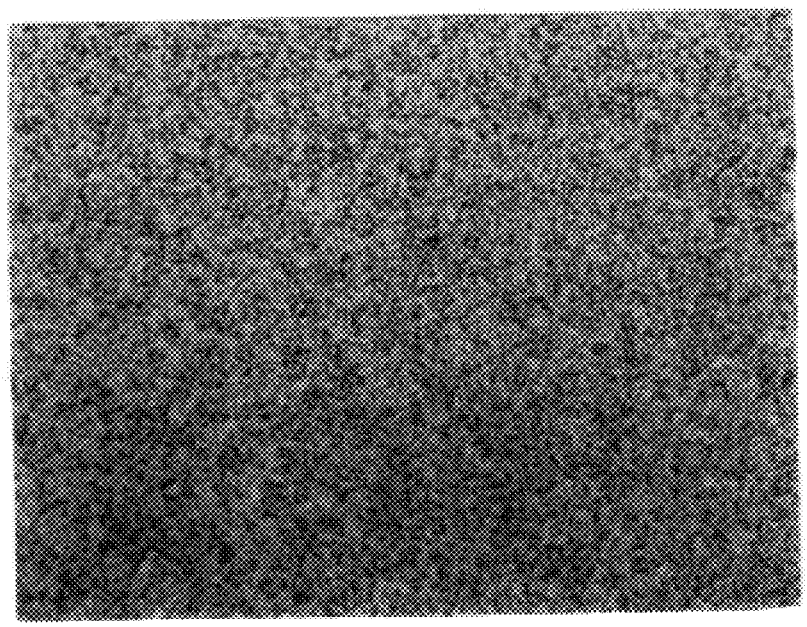
FIG. 2 is a microscopic photograph showing the metal structure of a prior art titanium alloy.

FIGS. 1 and 2 are photographs showing microstructure of titanium alloys; wherein FIG. 1 shows a microstructure of the inventive (α+β) type titanium alloy, and FIG. 2 shows a microstructure of a prior art (α+β) type titanium alloy (heat-treated at a temperature of from 700 to 750° C. for about two hours).

As seen from FIGS. 1 and 2, the grains of the prior art (α+β) type titanium alloy have sizes ranging from several μm to several ten μm; while the grains of the inventive (α+β) type titanium alloy are coarsened up to sizes ranging from 300 μm to 4 mm.

Figure 3:
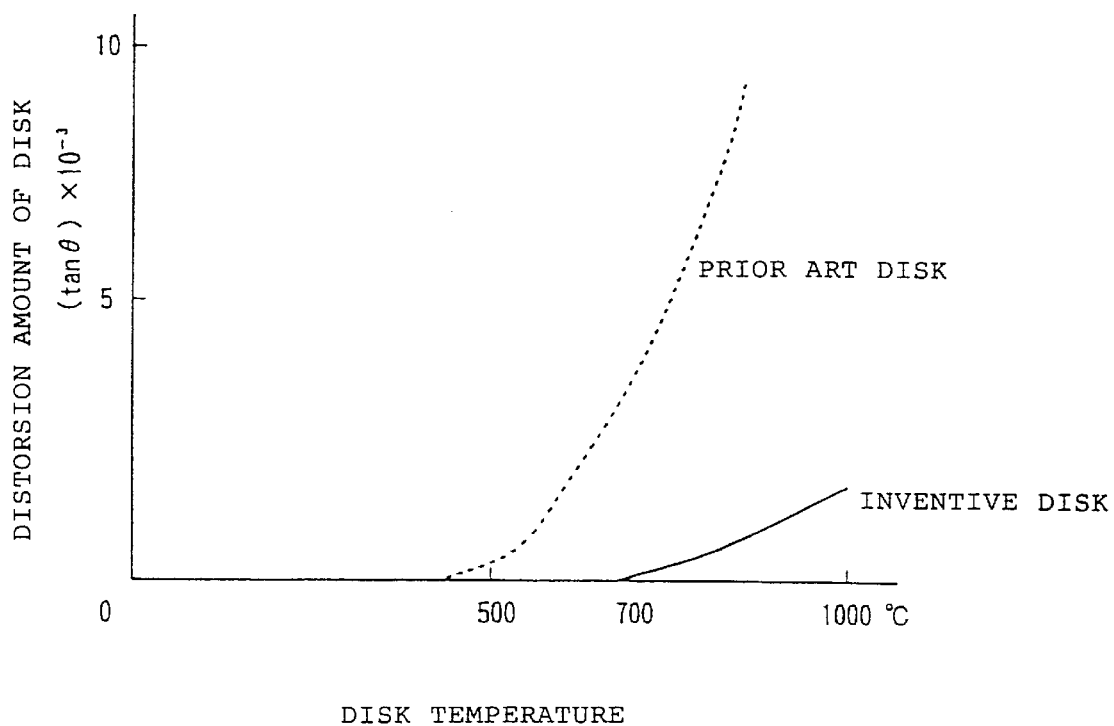
FIG. 3 is a graph illustrating a strain characteristic of a rotor depending on its temperature.
Figure 4:
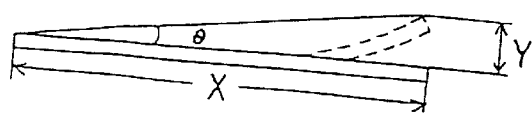
FIG. 4 is a schematic view illustrating a strain amount of a disk rotor.

Next, the deformation for high temperature will describe a distortion characteristic of the rotor temperature with reference to FIGS. 3 and 4.

FIG. 4 is a schematic view illustrating a strain amount of a disk, which is expressed by an inclination (tan θ)=y/x between a disk 1 having a thickness of 5 mm before a practical braking test (full-size test) and a disk 2 after the braking test. In FIG. 4, the disk 1 is indicated by a solid line and the disk 2 is indicated by a dashed line. It is to be noted that the strain amount of the disk in FIG. 3 is expressed in tan θ×10$^{-3}$.

FIG. 3 is a graph showing a relationship between a disk temperature and a disk strain amount, wherein the abscissa indicates a disk temperature and the ordinate indicates a disk strain amount in tan θ×10$^{-3}$. In addition, a solid line indicates the inventive rotor and a dotted line indicates the prior art rotor.

As shown in FIG. 3, in the practical braking test (full-size test) using the prior art brake rotor (thickness: 5 mm), there is produced a camber to the extent that the rotor cannot be used when the temperature of the rotor is increased up to 500° C. or more. On the other hand, as for the inventive disk rotor, there is not produced any camber even at the temperature of about 700° C. As a result, this reveals that the inventive brake rotor is improved in stiffness against thermal distortion.

According to the titanium alloy brake rotor having a metal structure composed of a (α+β) phase and containing equi-axed grains, it is possible to reduce the manufacturing cost by eliminating the need of a coating treatment, and hence to prevent a surface layer from being cracked or peeled upon operation of the rotor at a high temperature.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A titanium alloy brake rotor comprising:
a disk having a titanium alloy metal structure composed of a ($\alpha+\beta$) phase and containing equiaxeded grains having sizes ranging from about 300 $\mu$m to 4 mm, whereby deformation against thermal stress is reduced so that the disk does not camber up to a temperature of about 700° C.

2. The titanium alloy brake rotor according to claim 1, wherein said equiaxed grains have sizes ranging from 300 $\mu$m to 3 mm.

3. The titanium alloy brake rotor according to claim 1, wherein deformation stiffness against thermal stress of the titanium alloy is improved in the range of 500 to 800° C.

4. The titanium alloy brake rotor according to claim 1, wherein the titanium alloy is Ti-6Al-4V.

5. The titanium alloy brake rotor according to claim 1, wherein the titanium alloy is Ti-6Al-6V-2Sn.

6. The titanium alloy brake rotor according to claim 1, wherein the titanium alloy is Ti-6Al-2Sn-4Zr-6Mo.

7. The titanium alloy brake rotor according to claim 1, wherein the titanium alloy is Ti-6Al-2Sn-4Zr-2Mo.

8. The titanium alloy brake rotor according to claim 1, wherein the titanium alloy is Ti-6Al-2Sn-4Zr-2Mo-0.1Si.

9. The titanium alloy brake rotor according to claim 1, wherein the brake rotor is a disk having an inner surface with cutouts and semi-circular recesses formed therein.

10. The titanium alloy brake rotor according to claim 1, wherein a strain amount of the disk is less than about 5 (tan $\theta$)×10$^{-3}$ at 800° C., wherein tan $\theta$=y/x between a disk having a thickness of about 5 mm.

11. The titanium alloy brake rotor according to claim 1, wherein a strain amount of the disk is less than about 3 (tan $\theta$)×10$^{-3}$ at 800° C., wherein tan $\theta$=y/x between a disk having a thickness of about 5 mm.

12. The titanium alloy brake rotor according to claim 1, wherein a strain amount of the disk is less than about 2 (tan $\theta$)×10$^{-3}$ at 800° C., wherein tan $\theta$=y/x between a disk having a thickness of about 5 mm.

13. The titanium alloy brake rotor according to claim 1, wherein a strain amount of the disk is less than about 1 (tan $\theta$)×10$^{-3}$ at 800° C., wherein tan $\theta$=y/x between a disk having a thickness of about 5 mm.

14. The titanium alloy brake rotor according to claim 1, wherein the disk has a thickness of about 5 mm.

15. A titanium alloy brake rotor produced by a process comprising the steps of:
providing a titanium alloy disk having a metal structure composed of a ($\alpha+\beta$) phase and containing equiaxeded grains, whereby deformation against thermal stress is reduced; and
heat treating the ($\alpha+\beta$) type titanium alloy at a $\beta$ phase-transformation temperature, to form a metal structure composed of a ($\alpha+\beta$) phase and containing equiaxed grains having sizes ranging from about 300 $\mu$m to 4 mm, whereby deformation against thermal stress is reduced so that the disk does not camber up to a temperature of about 700° C.

* * * * *